United States Patent [19]

van der Merwe et al.

[11] Patent Number: 4,949,461
[45] Date of Patent: Aug. 21, 1990

[54] DUAL CONTROL HANDLE FOR PNEUMATIC TREE TRIMMER

[76] Inventors: Jacobus C. van der Merwe; Lucas C. van der Merwe, both of 801 Beechwood Dr., Kingsport, Tenn. 37663

[21] Appl. No.: 317,587

[22] Filed: Mar. 1, 1989

[51] Int. Cl.$^5$ ............ B26B 13/00; B26B 17/00; B26B 15/00; D02J 1/18
[52] U.S. Cl. ............ 30/245; 30/180; 30/228; 29/283.3
[58] Field of Search ............ 30/180, 190, 210, 216, 30/228, 245, 249; 29/283.5

[56] References Cited

U.S. PATENT DOCUMENTS

| | | | |
|---|---|---|---|
| 2,257,245 | 9/1941 | Rudolph | 30/228 |
| 2,751,943 | 6/1956 | Ford | 30/228 |
| 3,373,490 | 3/1968 | Lendaro | |
| 3,561,117 | 2/1971 | Murbach | 30/228 |
| 4,109,381 | 8/1978 | Pellenc | |
| 4,359,821 | 11/1982 | Pellenc | |
| 4,587,732 | 5/1986 | Lind et al. | 30/180 |
| 4,734,983 | 4/1988 | Brick | |

*Primary Examiner*—Douglas D. Watts
*Assistant Examiner*—Paul M. Heyrana
*Attorney, Agent, or Firm*—Fleit, Jacobson, Cohn, Price, Holman & Stern

[57] ABSTRACT

A trimmer device is disclosed which comprises cutting blades which are to be used for a trimming operation. A hollow air hose, through which pressurized fluid is supplied to the trimmer device, is provided. First and second selectively openable and closable valves are connected with one another and are disposed between the cutting blades and the hollow air hose. The trimmer device is formed with a passage therein which connects the hollow air hose to the first selectively openable and closable valve, the second selectively openable and closable valve, and the cutting blades. Handles, by which an operator can manually open and close each of the first and second selectively openable and closable valves independently, are pivotally mounted on the trimmer device. Each of the first and second selectively openable and closable valves are biased into a closed position prior to the trimming operation. Pressurized fluid is allowed to pass from the air hose, through which pressurized fluid is supplied, to the cutting blades to perform the trimming operation only when both of the first and second selectively openable and closable valves are manually opened by the operator.

5 Claims, 2 Drawing Sheets

DUAL CONTROL HANDLE FOR PNEUMATIC TREE TRIMMER

BACKGROUND OF THE INVENTION

1. Field of the Invention

This invention relates to a fluid actuated trimmer of the type which is typically used to prune trees, shrubs, or other vegetation. The trimmer is of the hand held and operated variety.

2. Description of Related Art

A known trimmer of the hand held and operated type, in the form of pneumatically operated shears, is disclosed by U.S. Pat. No. 3,373,490. The shears disclosed in this patent include a movable cutting blade which may be operated by moving one of two levers. The movement of either lever will cause pneumatic fluid to be supplied to a cylinder, which in turn moves the cutting blade. By using the appropriate lever to operate the cutting blade, the trimmer can be used to trim branches or the like which are both close to the ground and at a height which cannot be normally reached from the ground.

A known hand held trimmer, while being relatively easy to transport and maniplate, can be dangerous to an operator who incorrectly or inattentively uses the trimmer. Since the operation of known trimmers depends on the movement of but a single actuating lever, if the actuating lever is accidently bumped or moved, the trimmer may be operated at the wrong time and injury to the operator, such as cut or severed fingers, may result.

It is accordingly a primary object of the present invention to provide a hand held trimmer device which can be operated more safely and reliably than presently known trimmers. Two handles are provided on the present trimmer device, and both handles must be operated in order for the blades of the trimmer device to be moved. Thus, an operator is required to securely grip the trimmer with both hands, and the operator must consciously operate both handles of the trimmer device at the same time to actuate the trimmer device. If one of the handles is accidently bumped or moved, the trimmer device of the present invention will not be actuated. Possible injury to the operator will therefore be avoided.

SUMMARY OF THE INVENTION

The above object, among others, is achieved in the present invention by the provision of a trimmer device including cutting blades which are to be used for a trimming operation. A hollow air hose, through which pressurized fluid is supplied to the trimmer device, is provided. First and second selectively openable and closable valves are connected with one another and are disposed between the cutting blades and the hollow air hose. The trimmer device includes passage means therein which connects the hollow air hose, through which pressurized fluid is supplied, the first selectively openable and closable valve, the second selectively openable and closable valve, and the cutting blades. Handles, by which an operator can manually open and close each of the first and second selectively openable and closable valves independently, are pivotally mounted on the trimmer device. Each of the first and second selectively openable and closable valves is biased into a closed position prior to the trimming operation. Pressurized fluid is allowed to pass from the air hose, through which pressurized fluid is supplied, to the cutting blades to perform the trimming operation only when both of the first and second selectively openable and closable valves are manually opened by the operator.

BRIEF DESCRIPTION OF THE DRAWINGS

Referring now to the drawings, a preferred embodiment of the invention is illustrated, in which.

DESCRIPTION OF THE PREFERRED EMBODIMENT

Figure 2:
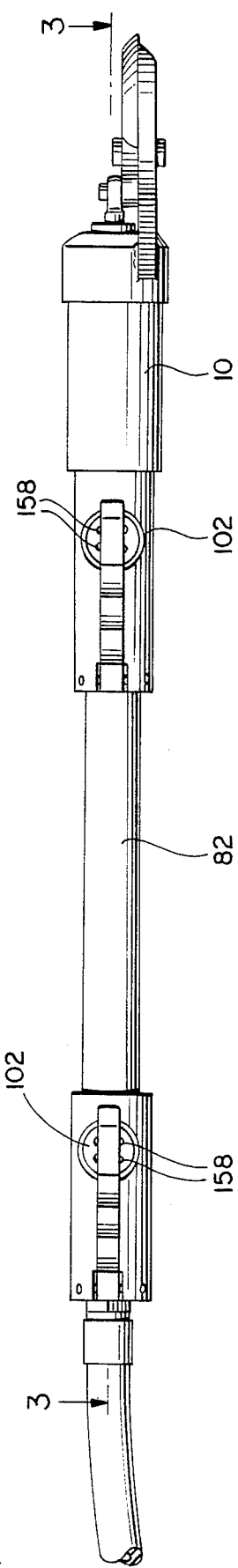
FIG. 2 is a bottom plan view of the trimmer device illustrated in FIG. 1.
Figure 3:
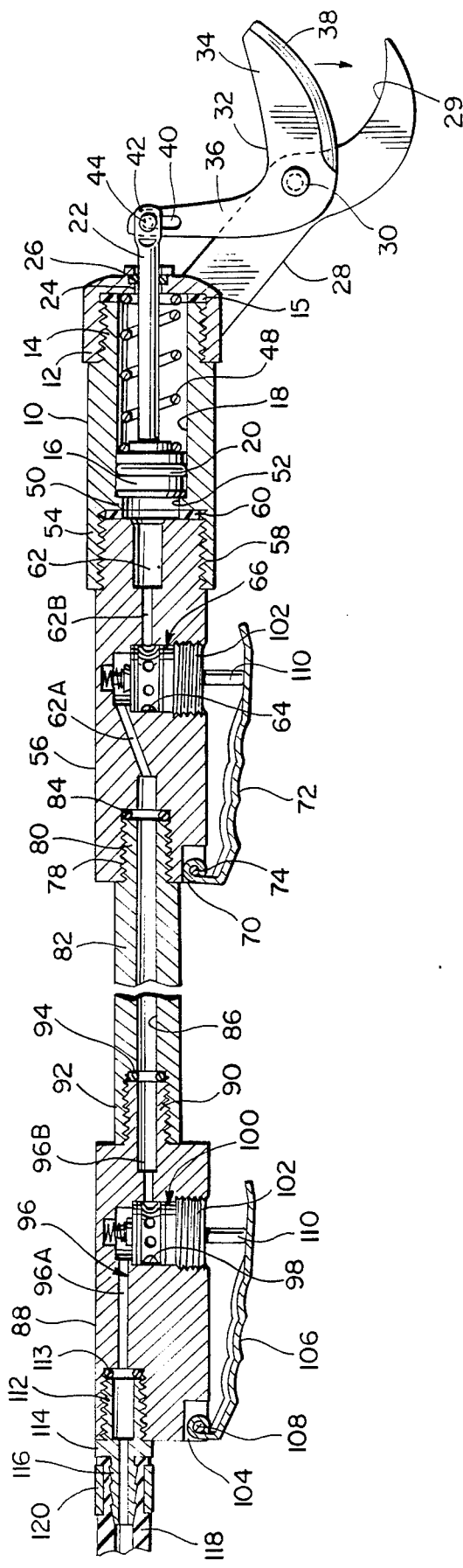
FIG. 3 is a sectional view of the trimmer device of FIG. 2 as it appears along section line 3—3.

Referring to FIGS. 2 and 3, the illustrated embodiment of the invention is shown to include a cylindrical piston housing 10 having an end cap 12 screwed on one end thereof. End cap 12 is provided with an internally threaded cylindrical recess, the threads of which cooperate with an externally threaded cylindrical extension 14 of cylindrical piston housing 10. A sealing washer 15 is provided between extension 14 and cap 12.

A substantially cylindrical piston 16 is slidably received within a central bore 18 formed in and extending through housing 10. Piston 16 is provided with a groove extending circumferentially about the piston. A typical O-ring seal 20 is received within the circumferentially extending piston groove and provides substantially airtight engagement between the piston and central bore 18.

Elongated, cylindrical piston rod 22 is integrally cast with, welded to, or otherwise rigidly affixed to piston 16. Piston rod 22 extends from one side of piston 16 centrally within bore 18 and through a central bore 24 in end cap 12. An O-ring seal 26 is disposed in a groove formed in the radially inwardly facing surface of bore 24 and engages the exterior cylindrical surface of piston rod 22 so as to form a guide for the piston rod as the piston rod is moved axially out of and into central bore 18 in a manner to be described.

A first, stationary cutting blade 28, including cutting portion 29, is welded or otherwise rigidly affixed to end cap 12. Cutting blade 28 has an aperture formed in its center portion, and a conventional rivet 30 is passed through this aperture. A second, movable cutting blade 32 includes an aperture in its center portion through which the rivet 30 passes. The second cutting blade 32 is thus made pivotally movable about rivet 30 relative to both first, stationary cutting blade 28 and cap 12. As will become clear, cutting blades 28 and 32 form cutting means to be used for a trimming operation only when a safe operating condition exists. As illustrated, movable cutting blade 32 is formed by integral arms 34 and 36 disposed at approximately a right angle to one another. Arm 34 is provided with a cutting portion 38, which cooperates with cutting portion 29 of stationary cutting blade 28.

Arm 36 is provided with an elongated slot 40 in its end. Piston rod 22 extends outwardly through central bore 24 in end cap 12 and has an end 42. End 42 of the piston rod is located directly adjacent elongated slot 40 and has an aperture provided therein which is aligned with slot 40. A pin or rivet 44 passes through both the aperture in end 42 of the piston rod and through elongated slot 40 so that piston rod 22 is pivotally coupled to cutting blade arm 36.

A compression spring 48 surrounds and extends coaxially with piston rod 22 in central bore 18. Compression spring 48 extends between a surface of piston 16 and an inner surface of end cap 12. The compression spring biases piston 16 and piston rod 22 to the left in FIG. 3 so that piston 16 is normally forced against a radially inwardly directed flange 50 provided at the end of central bore 18 opposite cap 12. Radially inwardly directed flange 50 surrounds a reduced diameter bore portion 52 of housing 10.

Housing 10 is, as illustrated, provided with an internally threaded, cylindrical extension 54 at an end of the housing opposite cylindrical extension 14. A first cylindrical valve unit 56 is provided with an externally threaded, cylindrical extension 58 which is screwed into extension 54. A sealing washer 60 is disposed between extension 58 of valve unit 56 and flange 50 of housing 10 in order to provide an airtight connection between the first valve unit and housing 10.

Valve unit 56 is formed with an air passage 62 therein which passes from one end of the valve unit to the other. As can be seen from FIG. 3, air passage 62 opens into reduced diameter bore portion 52, and hence to central bore 18 of piston housing 10.

A stepped valve unit bore 64 is drilled or otherwise formed so as to extend in a radial direction relative to first valve unit 56 to intersect air passage 62. First selectively openable and closable valve 66 is disposed within stepped valve unit bore 64 and retained within the stepped bore by an externally threaded plug as will be described. Details of valve 66 are explained below in connection with FIGS. 4 and 5.

As illustrated in FIG. 3, valve unit 56 includes a notch or recess 70 at its end opposite cylindrical extension 58. A first pivotable handle 72 is pivotally mounted about a pin 74 soldered, welded or otherwise rigidly affixed within notch 70. Handle 72 engages a valve stem which operates to selectively open and close valve 66 in a manner yet to be described.

At its end opposite the externally threaded, cylindrical extension 58, the first cylindrical valve unit 56 is, as illustrated, provided with a recess which is internally threaded at 78. An externally threaded, protruding end portion 80 of a tubular pipe 82 is screwed into the internally threaded recess. A typical O-ring seal 84 is disposed between portion 80 and cylindrical valve unit 56 in order to make the connection between pipe 82 and valve unit 56 airtight. Tubular pipe 82 has an air channel 86 therein which extends completely through the pipe and opens into air passage 62.

Second cylindrical valve unit 88 is disposed at the end of tubular pipe 82 opposite that end to which the first cylindrical valve unit 56 is attached. In the illustrated embodiment, unit 88 is provided at one end with an externally threaded extension 90 which is received within an internally threaded extension 92 of tubular pipe 82. A typical O-ring seal 94 is disposed between extension 9 and tubular pipe 82 in order to make the connection between cylindrical valve unit 88 and tubular pipe 82 airtight.

The second cylindrical valve unit 88 is constructed similarly to first cylindrical valve unit 56 and includes an air passage 96 therein which passes from one end of valve unit 88 to the other. Stepped valve unit bore 98, which is substantially identical to stepped valve unit bore 64 described previously, extends in a radial direction relative to the second valve unit 88 so as to intersect air passage 96. A second selectively openable and closable valve 100, identical to and connected in series with the first selectively openable and closable valve 66, is disposed within stepped bore 98 and is retained in bore 98 by externally threaded plug 102. Thus, a plug 102 is in threaded engagement with each of the stepped bores 64 and 98 to retain each selectively openable and closable valve in its respective stepped bore. Portion 52, air passages 62 and 96, and air channel 86 together form air passage means provided in the trimmer device.

Figure 4:
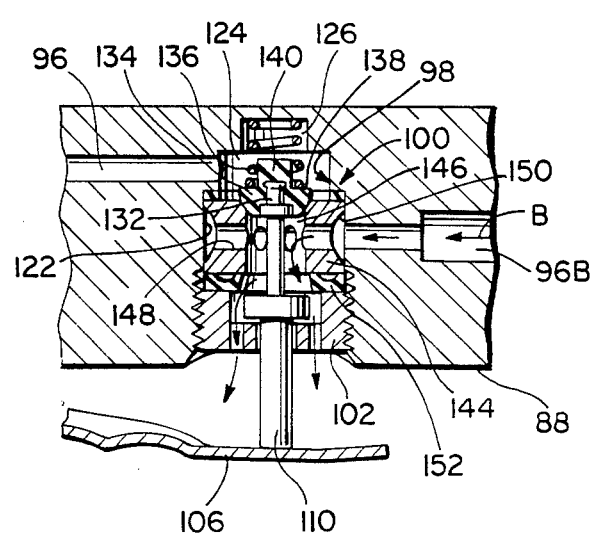
FIG. 4 is an enlarged sectional view of a valve, in a closed position, as it is used in the trimmer device.
Figure 5:
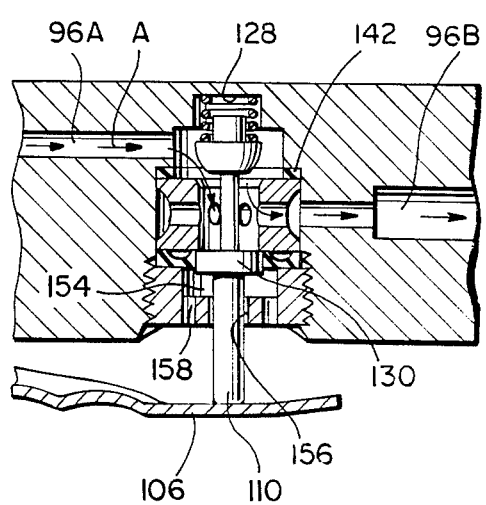
FIG. 5 is an enlarged sectional view similar to FIG. 4, but showing the valve its open position.

Referring now to FIGS. 4 and 5, the operation of valve 100 and its cooperation with air passage 96 will be described in detail, it being understood that valve 66 operates and cooperates with air passage 62 in an identical manner.

As noted previously, valve 100 is disposed and retained within a stepped bore 98, which intersects air passage 96. Stepped bore 98 includes three substantially cylindrical portions 122, 124 and 126 of successively increasing diameter. As FIG. 4 illustrates, cylindrical portion 126 is closed off by an end wall 128 of the stepped bore.

The second cylindrical valve unit is shown as including a notch or recess 104 at its end opposite extension 90. A second pivotable handle 106, which is identical to handle 72, is pivotally mounted about a pin 108 rigidly affixed within notch 104 in a manner similar to pin 74. Handle 106 engages valve stem 110 which operates to selectively open and close valve 100. Handles 72 and 106 cooperate with valve stem 110 and form means by which an operator can manually open and close the first and second selectively openable and closable valves 66 and 100 independently.

At its end opposite extension 90, the second cylindrical valve unit 88 is provided with an internally threaded bore within which an externally threaded extension 112 of a standard hollow coupling 114 is screwed. An O-ring seal 113 is provided to assure an airtight connection between the coupling 114 and valve unit 88. At its end opposite extension 112, the coupling includes a ribbed projection 116 to which a hollow air hose 118 is secured by means of a clamp 120. The hollow air hose 118 forms a means through which pressurized fluid, in this case air, is supplied to the trimmer device. The passage means formed by portion 52, air passages 62 and 96 and air channel 86 connects the hollow air hose, the first and second selectively openable and closable valves and the cutting means to one another, as should be clear from FIG. 3. Coupling 114 includes a passage extending therethrough communicating the interior of air hose 118 to air passage 96.

Valve stem 110 has a annular flange 130 integrally formed thereon at a central portion of the valve stem. Valve stem 110 extends longitudinally in and centrally of stepped bore 98 and terminates in end portion 132. A valve seal 134, preferably formed of Teflon, is molded onto or otherwise secured to end portion 132 of valve stem 110. A compression-type coil spring 136 is disposed between end wall 128 and a spring seat 138. Valve seal 134 includes an upstanding central portion 140 which is received within the coils of spring 136 to stabilize the spring and keep the spring positioned on valve seal 134.

A sealing washer 142 abuts against a shoulder formed in the stepped bore 98 between the largest diameter bore portion 122 and the middle diameter bore portion 124. The sealing washer is disposed between one flat side of an annular element 144 and the shoulder. The annular element 144 includes a central, longitudinally extending bore 146. Bore 146 is intersected by a plurality of apertures 148 passing through the annular walls of and oriented to extend radially relative to the annular element 144. Valve stem 110 extends through bore 146 as illustrated. As FIGS. 3–5 show, apertures 148 open into a groove 150, which extends circumferentially around the outer surface of annular element 144.

An annular lipped seal 152 is retained between a flat side of annular element 144 opposite washer 142 and the externally threaded plug 102. As FIGS. 4 and 5 show, externally threaded plug 102 has a recess 154 in one of its sides, and includes an axially extending central bore 156 and a plurality of smaller bores 158 parallel to and surrounding the central bore 156.

Each of the sealing washers 15, 60 and 142, O-ring seals 20, 26, 84, 94, 113 and annular lipped seal 154 may be formed in a conventional manner of natural rubber or synthetic rubber, such as styrene-butadiene, neoprene or butyl rubber, for example. Blades 28 and 32 are preferably made of a high-strength metal or metal alloy, such as stainless steel or the like. The majority of the remaining elements which form the trimmer device according to the present invention, including housing 10, valve units 56 and 88, and tubular pipe 82, can be made of any suitable and preferably lightweight metal or metal alloy, such as an aluminum alloy.

Figure 1:
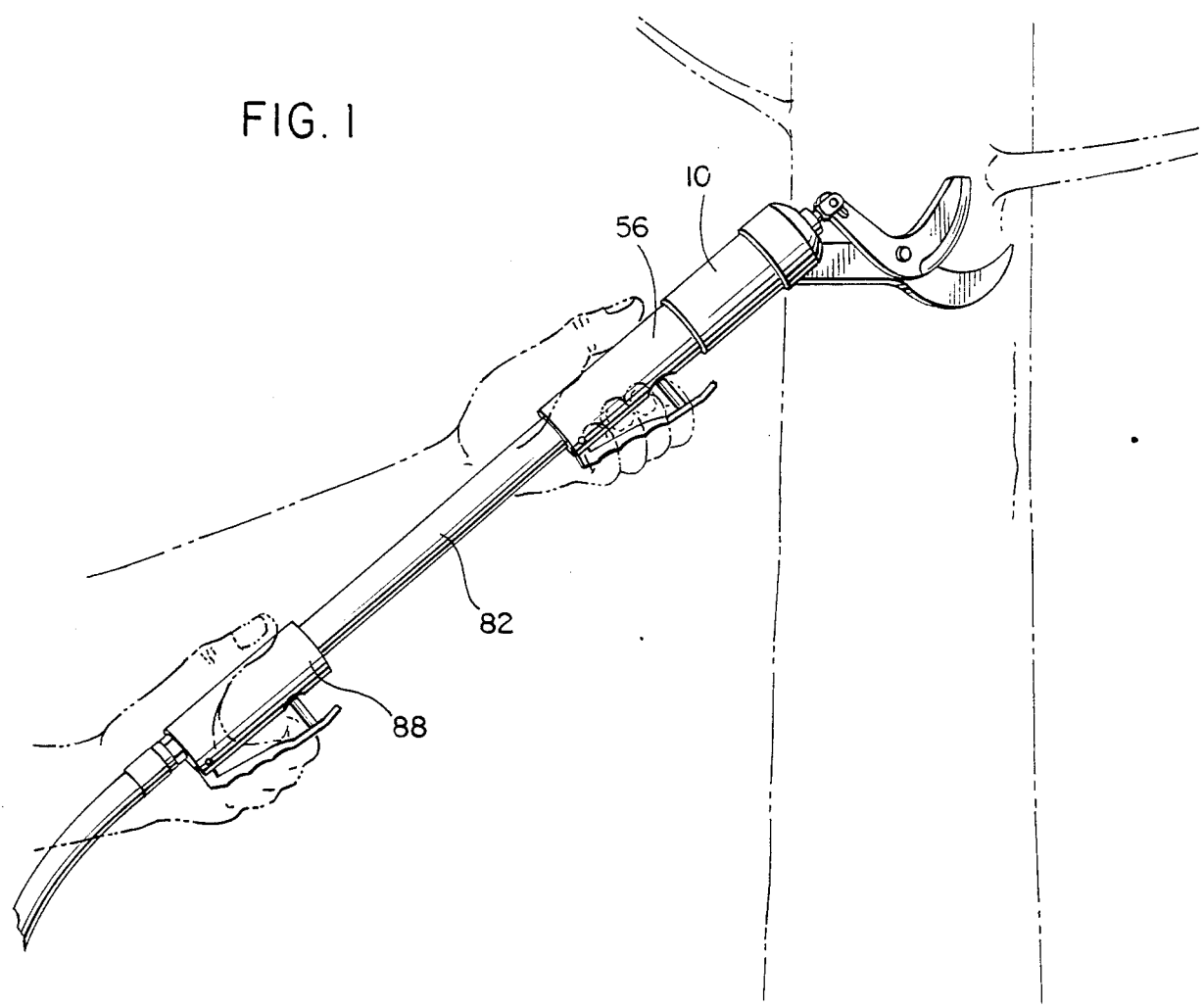
FIG. 1 is a perspective view of the trimmer device as it is held by an operator.

In operation, prior to the time the present trimmer device is used to sever a tree limb or the like, air is supplied in a known manner and at a typical pressure from an air compressor or other air supplying device (not shown) to hollow air hose 118, through the coupling 114 and to a portion 96A of air passage 96. An operator grasps valve units 56 and 88, as shown in FIG. 1, and moves the trimmer device so that the cutting portions 29 and 38 of blades 28 and 32 are disposed about a tree limb which is to be trimmed.

During this time, before the blades 28 and 32 are to be actuated, each valve stem 110 of valves 66 and 100 is biased into an outermost position within stepped bores 64 and 98 by spring 136 in the manner shown in FIG. 4. Valve seal 134 of each valve 66 and 100 is thus biased by spring 136 into abutment with a valve seat located on element 144 at an end of central bore 146. Each of the first and second selectively openable and closable valves is thus biased into a closed position, in which valve seal 134 engages the valve seat, prior to the trimming operation. At this point, air supplied to hollow air hose 118 is prevented from flowing past valve seal 134 of the second valve 100, and therefore passing through valve unit 88, because of the abutment of the valve seal with the valve seat on annular element 144. The air supplied to hose 118 is thus retained in portion 96A of air passage 96.

After blades 28 and 32 have been properly positioned for cutting, in order to actuate movable cutting blade 32, the operator squeezes on handles 72 and 106 so that they pivot about pins 74 and 108, respectively. As the handles 72 and 106 are pivoted about their respective pins, the handles, which engage valve stems 110 of valves 66 and 100, displace each stem 110 to an innermost position in bores 64 and 98 against the force of spring 136. Valve seal 134 of each valve 66 and 100 is thus moved away from its seat on element 144 and into the position shown in FIG. 5. Simultaneously, annular flange 130 is moved into engagement with element 144 so that it covers the end of bore 146 opposite the seat for valve seal 134 and prevents air from escaping through bore 158 of externally threaded plug 102.

Once valve seal 134 of the valve 100 has been moved away from its seat on element 144, and flange 130 has come into contact with element 144, compressed air is free to flow in the direction of arrow A in FIG. 5 from passage portion 96 A through bore 146, apertures 148 and around groove 150, and into passage portion 96B of valve unit 88. At this point, valve 100 is in an open position. The air then flows from hose 118, through valve unit 88, and through air channel 86 of tubular pipe 82 to portion 62A of air passage 62 in valve unit 56.

To perform the trimming operation, valve seal 134 of valve 66 has to be moved away from its seat on element 144, in a manner identical to that by which seal 134 of valve 100 has been moved away from its seat, under the action of handle 72. Only then will air be free to flow from hose 118 past valve 100, and then past valve 66 from passage portion 62A to passage portion 62B of valve unit 56, and into piston housing 10. The compressed air displaces piston 16 and piston rod 22 against the force of compression spring 48. Displacement of piston rod 22 causes cutting blade 32 to pivot about rivet 30 relative to blade 28 to trim the tree limb.

Upon completion of the trimming operation, the operator releases his grip on handles 72 and 106. Each spring 136 then forces its respective stem 110 back into its outermost positions, as shown in FIG. 4, so that each valve seal 134 is again seated on the valve seat provided on elements 144. Annular flanges 130 are simultaneously displaced away from elements 140 so that the ends of bores 146 opposite the seats for valve seals 134 are uncovered. The compressed air in piston housing 10 and in the air passages of the trimmer device is exhausted by passing back around grooves 150, through apertures 148 and bore 146 of each valve, and to the atmosphere through recess 154 and bores 158 in plugs 102 in the direction of arrow B in FIG. 4. Compression spring 48 returns piston 16 to the position shown in FIG. 3, thus causing blade 32 to pivot about rivet 30 back into its initial position.

It should be clear from the foregoing description that in order for compressed air to reach cylindrical piston housing 10 from the hollow air hose 118, both handle 72 and handle 106 must be squeezed by the operator. If only one of the handles squeezed, the valve seal 134 of the check valve associated with the unsqueezed handle will remain seated on its annular element 144. In this manner, air will be prevented from reaching housing 10 by the check valve associated with the unsqueezed handle. Air thus passes from hollow air hose 118 to the housing 10 and the cutting means formed by blades 28 and 32 to perform a trimming operation only when both valves 66 and 100 are manually opened by the operator.

Since both of an operator's hands are required to unseat both valve seals 134 for actuation of the trimmer device, it is virtually impossible for the operator to accidently cut or sever his or her fingers during use of the trimmer.

The foregoing is to be considered as illustrative only of the principles of the invention. Since numerous modifications and changes may occur to those skilled in the art, it is not desired to limit the invention to the exact construction and operation shown and described. There may be many suitable modifications to and equivalents of the invention that fall within the scope of the invention defined by the appended claims.

We claim:

1. A trimmer device comprising:

cutting means to be used for a trimming operation;

means through which pressurized fluid is supplied to said trimmer device;

first and second selectively openable and closable valves connected with one another and disposed between said cutting means and the means through which pressurized fluid is supplied, the trimmer device including passage means provided therein which connects said means through which pressurized fluid is supplied, said first selectively openable and closable valve, said second selectively openable and closable valve, and said cutting means;

means by which an operator can manually open and close said first and second selectively openable and closable valves independently;

each of said first and second selectively openable and closable valves being biased into a closed position prior to said trimming operation, and pressurized fluid passing from said means through which pressurized fluid is supplied to said cutting means to perform said trimming operation only when both of said first and second selectively openable and closable valves are manually opened by the operator.

2. A trimmer device as defined in claim 1, and further comprising:

first and second substantially cylindrical valve units, each including a valve unit bore within which said first and second selectively openable and closable valves are disposed.

3. A trimmer device as defined in claim 2, and further comprising:

a plug disposed within and in threaded engagement with each of said valve unit bores to retain said first and second selectively openable and closable valves in its respective valve unit bore.

4. A trimmer device as defined in claim 3, wherein each of said selectively openable and closable valves comprises:

an annular element including a central, longitudinally extending bore, a plurality of apertures, intersecting said central, longitudinally extending bore, oriented to extend radially relative to said annular element, and a groove, into which the apertures open, extending circumferentially around an outer surface of said annular element;

a sealing washer disposed between said annular element and a shoulder formed in said valve unit bore;

an annular seal disposed between said annular element and said plug;

a valve stem extending through said longitudinally extending bore in said annular element;

a valve seal secured to one end portion of said valve stem;

an annular flange formed on a central portion of said valve stem;

spring means biasing said valve seal into abutment with a valve seat located at one end of said central, longitudinally extending bore;

the selectively openable and closable valve being biased by said spring means into said closed position, in which said valve seal engages said valve seat, to prevent said pressurized fluid from passing through the valve unit within which the selectively openable and closable valve is located.

5. A trimmer device as defined in claim 4, wherein said means by which an operator can manually open and close said first and second selectively openable and closable valves independently comprises:

a handle mounted on each of said valve units and engaging one of said valve stems, said handle being pivotable by an operator to move the selectively openable and closable valve into an open position by displacing said valve stem against the force of said spring means, moving said valve seal away from said valve seat, and simultaneously moving said annular flange into engagement with said annular element so that it covers an end of said longitudinally extending bore opposite said valve seat, to allow said pressurized fluid to pass through the valve unit.

* * * * *